(12) United States Patent
Vandier et al.

(10) Patent No.: US 12,304,535 B2
(45) Date of Patent: May 20, 2025

(54) UNLOCKING SYSTEM, BOGIE COMPRISING SUCH A SYSTEM AND ASSOCIATED MANUFACTURING METHOD

(71) Applicant: ALSTOM Holdings, St Ouen sur Seine (FR)

(72) Inventors: Mathieu Vandier, Le Plan Medoc (FR); Michael Lafay, St Germain du Plain (FR)

(73) Assignee: ALSTOM Holdings, Saint-Ouen-sur-Seine (FR)

( * ) Notice: Subject to any disclaimer, the term of this patent is extended or adjusted under 35 U.S.C. 154(b) by 0 days.

(21) Appl. No.: 18/349,894

(22) Filed: Jul. 10, 2023

(65) Prior Publication Data
US 2024/0010247 A1 Jan. 11, 2024

(30) Foreign Application Priority Data

Jul. 11, 2022 (FR) ................................. FR2207097

(51) Int. Cl.
*B61H 13/02* (2006.01)
*B33Y 80/00* (2015.01)
(Continued)

(52) U.S. Cl.
CPC .............. *B61H 13/02* (2013.01); *B33Y 80/00* (2014.12); *F16D 65/28* (2013.01);
(Continued)

(58) Field of Classification Search
CPC ......... B61H 13/02; B33Y 80/00; F16D 65/28; F16D 2121/14; F16D 2125/64; F16D 2127/04; F16D 2250/00
See application file for complete search history.

(56) References Cited

U.S. PATENT DOCUMENTS 1,486,721 A * 3/1924 Bennett .................. B61H 13/02
74/528
3,719,106 A * 3/1973 Schroter ................. B60T 11/08
74/518
(Continued)

FOREIGN PATENT DOCUMENTS

CN 205836839 U 12/2016
CN 106672013 A 5/2017
(Continued)

OTHER PUBLICATIONS

Lever Latch website, 2019, https://www.printables.com/model/236811-lever-latch-with-locking-system (Year: 2019).*
(Continued)

*Primary Examiner* — Thomas C Diaz
(74) *Attorney, Agent, or Firm* — Knobbe, Martens, Olson & Bear LLP

(57) ABSTRACT

An unlocking system for at least one brake of a bogie includes an unlocking device configured for being attached to at least one cable connected to the at least one brake, and a support that includes a shaft forming a first axis of rotation. The unlocking device is rotatable with respect to the support about the first axis of rotation between a rest position and at least one unlocking position. The unlocking device is configured for exerting a traction on the at least one cable. The unlocking system can be produced at least partially by additive manufacturing.

11 Claims, 6 Drawing Sheets

(51) Int. Cl.
*F16D 65/28* (2006.01)
*F16D 121/14* (2012.01)
*F16D 125/64* (2012.01)
*F16D 127/04* (2012.01)

(52) U.S. Cl.
CPC ...... *F16D 2121/14* (2013.01); *F16D 2125/64* (2013.01); *F16D 2127/04* (2013.01); *F16D 2250/00* (2013.01)

(56) References Cited

U.S. PATENT DOCUMENTS 10,994,799 B1 * 5/2021 Zaehnle .................. G05G 1/04
11,958,581 B2 * 4/2024 Despineux ........... B63H 21/213

FOREIGN PATENT DOCUMENTS

| CN | 111332329 A | 6/2020 | |
|---|---|---|---|
| CS | 205945 B1 * | 5/1979 | ............. F16D 65/14 |
| FR | 3064580 A1 | 10/2018 | |

OTHER PUBLICATIONS

Machine translation of CS 205945 B1, obtained from fit database (Year: 1981).*
French Search Report issued in the French Patent Application No. 22 07097, dated Mar. 1, 2023 in 2 pages.

* cited by examiner

UNLOCKING SYSTEM, BOGIE COMPRISING SUCH A SYSTEM AND ASSOCIATED MANUFACTURING METHOD

CROSS-REFERENCE TO RELATED APPLICATION

This application claims priority to French Patent Application No. FR 22 07097 Jul. 11, 2022, the disclosure of which including the specification, the drawings, and the claims is hereby incorporated by reference in its entirety.

FIELD OF THE INVENTION

The present invention relates to a system for unlocking at least one bogie brake.

The invention also relates to a bogie comprising such an unlocking system.

The present invention further relates to a method for manufacturing such an unlocking system.

BACKGROUND OF THE INVENTION

Railway vehicles comprise bogies with brakes, such as parking brakes. When the vehicle parking brake is locked, it is not possible to move the vehicle. In operation, a parking brake is unlocked by means of an electrical signal. Provision is further made to unlock the brake without supplying electricity to the railway vehicle. To this end, a manual unlocking system is installed. Such system is used for the manual release of the brake by an operator, when the vehicle is not supplied with electricity.

Such an unlocking system is described in the document FR 3 064 580 A1 of the Applicant. Such an unlocking system is used for unlocking the parking brake manually, by actuating a lever arm which transforms a force applied by an operator into a traction force for unlocking the brake.

Such a system can be further improved. More particularly the system comprises a large number of parts produced separately and then assembled for forming the system, which is relatively complex and tedious. Furthermore, such a system has a considerable weight.

BACKGROUND OF THE INVENTION

Thereby, an aim of the invention is to obtain a simpler unlocking system and a simpler manufacturing method.

Another goal of the invention is to obtain a lighter unlocking system.

To this end, the invention relates to a system for unlocking at least one brake of a bogie comprising:
  an unlocking device configured for being attached to at least one cable connected to the at least one brake;
  a support comprising a shaft forming a first axis of rotation, the unlocking device being rotatable with respect to the support about the first axis of rotation between a rest position and at least one unlocking position wherein the unlocking device is configured for exerting a traction on the at least one cable.

The unlocking system is produced at least partially by additive manufacturing.

The unlocking system according to the invention is indeed very simple, because due to additive manufacturing, the number of parts of the system can be reduced. For example, at least a portion of the unlocking device and/or of the support can be manufactured in one piece by additive manufacturing. According to one example, additive manufacturing is used for simplifying the unlocking system, since additive manufacturing makes it possible to manufacture a plurality of the components of the system which are connected together so that same cannot be disassembled. For example, by the additive manufacturing of such connection, such manufacturing makes it possible to connect the unlocking device to the shaft of the support so that same cannot be disassembled. The above makes it possible e.g. not to mount the unlocking device on the shaft in an additional step and thereby to simplify the manufacturing process of the unlocking system as a whole.

Furthermore, due to additive manufacturing, the unlocking system is lighter, because such manufacturing makes it possible to modify the geometry of the element or the elements which are manufactured by additive manufacturing in a flexible way, in particular in order to reduce the quantity of material needed for the manufacture.

According to other features of the unlocking system according to the invention, taken individually or according to all technically possible combinations:
  one among the unlocking device and the shaft comprises a first groove, produced by additive manufacturing and arranged circularly all around the first axis of rotation, and the other among the unlocking device and the shaft comprises a first protruding part, produced by additive manufacturing, matching the first groove;
  the unlocking device and/or the support has at least one hollow part;
  the unlocking device comprises a lever, including a gripping part, and an attachment element configured for being attached to the at least one cable;
  the attachment element is rotatable relative to the lever about a second axis of rotation parallel to the first axis of rotation;
  the lever has a hole letting through the attachment element along the second axis of rotation;
  one among the attachment element and the lever has a second groove, produced by additive manufacturing and arranged circularly around the second axis of rotation, and the other among the attachment element and the lever has a second protruding part, produced by additive manufacturing, matching the second groove;
  the attachment element comprises at least one attachment eyelet for attaching at least one cable, the attachment eyelet having an opening extending along an axis substantially perpendicular to the second axis of rotation;
  the unlocking device and/or the support is/are obtained entirely by additive manufacturing;
  the unlocking system further includes a spring element attached both to the support and to the unlocking device, the spring element forcing the unlocking device towards the rest position;
  the support comprises a base structure configured for being attached to the bogie, and a connecting structure defining at least one aperture, the connecting structure connecting the base structure to the shaft;
  the unlocking device is configured for being attached to at least two cables connected to distinct brakes.

A further subject matter of the invention relates to a bogie comprising at least one brake and at least one cable connected to said brake. The bogie comprises an unlocking system as described hereinabove, and the cable is attached to the unlocking device of the unlocking system.

A further subject matter of the invention is a manufacturing method for a system for unlocking at least one bogie brake, comprising:

a first step of manufacturing an unlocking device configured for being attached to at least one cable connected to at least one brake;

a second step of manufacturing a support comprising a shaft forming a first axis of rotation, the unlocking device being rotatable with respect to the support about the first axis of rotation between a rest position and at least one unlocking position wherein the unlocking device is configured for exerting a traction on the at least one cable.

The first and/or the second manufacturing steps comprises an additive manufacturing step.

BRIEF DESCRIPTION OF THE DRAWINGS

Other aspects and advantages of the invention will appear upon reading the following description, given only as an example, and making reference to the enclosed drawings, wherein.

DETAILED DESCRIPTION OF THE PREFERRED EMBODIMENTS

Hereinafter in the description, the expression "substantially equal to" refers to a relation of equality within plus or minus 10%, preferentially within plus or minus 5%. Furthermore, the expression "substantially perpendicular to" refers to a relation of equality within plus or minus 10 degrees, preferentially within plus or minus 5 degrees.

Figure 1:
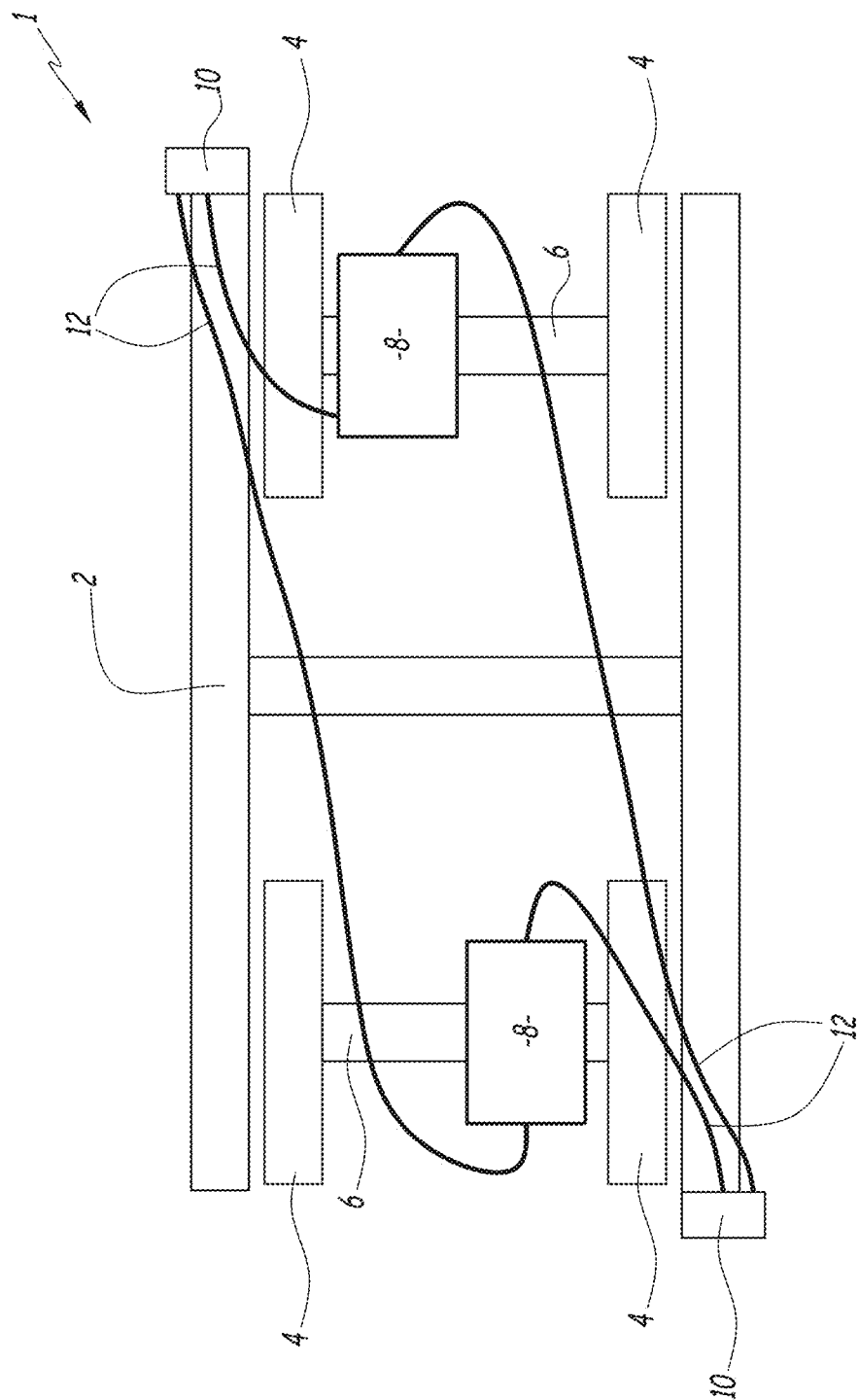
FIG. 1 is a top view schematic representation of a bogie comprising two unlocking systems according to the invention.

With reference to FIG. 1, a bogie 1 of a railway vehicle comprises a chassis 2, two pairs of wheels 4 connected by respective axles 6, at least one brake 8, such as a parking brake, connected to a corresponding axle 6 for braking the axle, at least one unlocking system 10 of the brake 8 and at least one cable 12 connecting the unlocking system 10 to the brake 8 for unlocking the brake 8.

In the example shown in FIG. 1, the bogie 1 comprises two brakes 8 each connected to a respective axle 6, and two unlocking systems 10 for unlocking the brakes 8.

Each unlocking system 10 is e.g. attached to two cables 12, respectively, one of which is connected to one of the two parking brakes 8 and the other to the other of the two parking brakes 8. The above makes it possible, more particularly, to simultaneously unlocthe two parking brakes 8, by actuating only one of the unlocking systems 10.

Preferentially, the unlocking systems 10 are arranged on transversely opposite sides of the bogie 1 and each is connected to each brake 8 by respective cables 12. More particularly, the above enables an operator to unlock both brakes 8 at the same time by actuating only one of the unlocking systems 10, as desired, without going around the bogie 1.

According to a variant, the bogie 1 comprises only one parking brake 8 or more than two parking brakes 8, and/or only one unlocking system 10 or more than two unlocking systems 10.

Each cable 12 is configured for transmitting a force which is applied by the unlocking system 10 to the brake 8 actuated by the release system.

Each cable 12 is e.g. connected directly to the respective brake 8. A traction force is thus transferred from the unlocking system 10 through the cable 12 directly to the brake 8, without any transformation of the force by a lever arm at the brake 8.

Each cable 12 is sheathed e.g. by a cable sheath (not shown). The cable 12 is movable along a cable axis with respect to the cable sheath.

Each cable 12 is e.g. a Bowden cable.

The unlocking system 10 will be now described with reference to FIGS. 2 to 6.

The unlocking system 10 comprises a support 14 and an unlocking device 16 attached to the cable(s) 12.

The unlocking system 10 is produced at least partially by additive manufacturing. Additive manufacturing is also called 3D printing.

Additive manufacturing means in particular, the manufacture of an element by adding material in successive layers.

Preferentially, the unlocking device 16 or the support 14 is entirely produced by additive manufacturing, more preferentially both the unlocking device 16 and the support 14 are entirely produced by additive manufacturing.

"Produced by additive manufacturing" means an element which has a specific material structure produced e.g. by 3D printing and/or a geometry which can preferentially be produced only by 3D printing.

A person skilled in the art understands that additive manufacturing involves specific features on the material structure and the geometry of the unlocking system 10. More particularly, a person skilled in the art distinguishes a material structure and a geometry produced by additive manufacturing with respect to structures produced by other manufacturing techniques, such as welding, machining, molding or forging.

For example, the material of the unlocking system 10 has a variable density, e.g. depending on a thickness of each layer added by additive manufacturing.

Additive manufacturing makes it possible in particular to produce shapes or assemblies which cannot be produced by said other manufacturing techniques. Thereby, apertures or openings are e.g. easily made in one piece by additive manufacturing, whereas same are not easy to produce by molding because of the stresses related to mold release. By welding, machining or forging, the presence of such openings requires a plurality of production operations, such as cutting and/or assembly operations, whereas same can be produced in only one additive manufacturing operation.

For example, the unlocking system 10 comprises revolute joints about a first axis of rotation X1, and about a second axis of rotation X2, having a geometry obtained by additive manufacturing. More particularly, the revolute joints cannot be disassembled, which can only be obtained by additive manufacturing.

Examples of such revolute joints are described hereinbelow.

Preferentially, the support 14 is made of only one piece. The above means that the different parts of the support 14, described hereinafter, are integral with one another.

Preferentially, the support 14 is made of aluminum.

The support 14 comprises a shaft 18 forming the first axis of rotation X1, a base structure 20 configured for being attached to the bogie 1, and a connecting structure 22 connecting the base structure 20 to the shaft 18.

Figure 2:
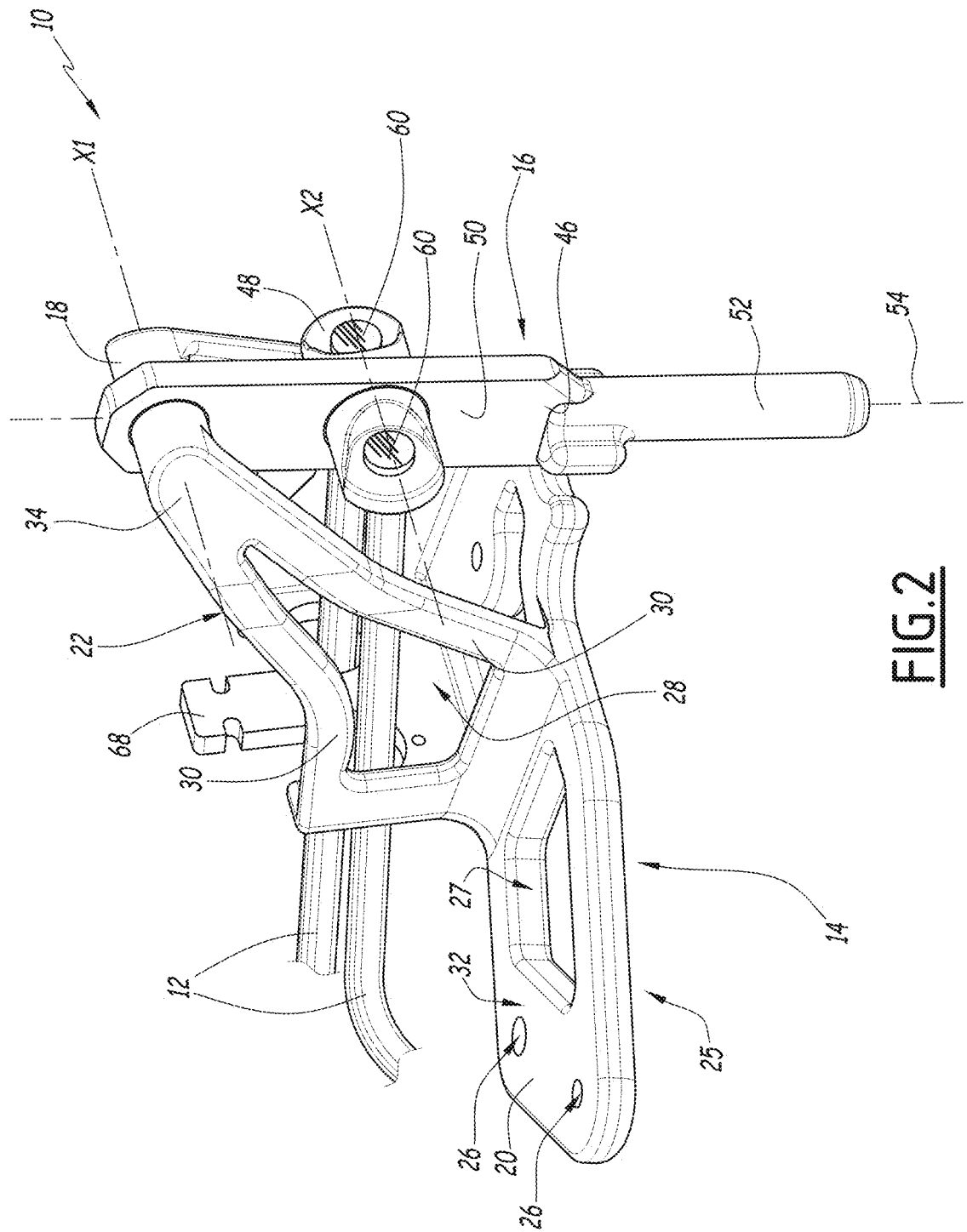
FIG. 2 is a schematic perspective view of the unlocking system according to the invention, in the rest position.
Figure 3:
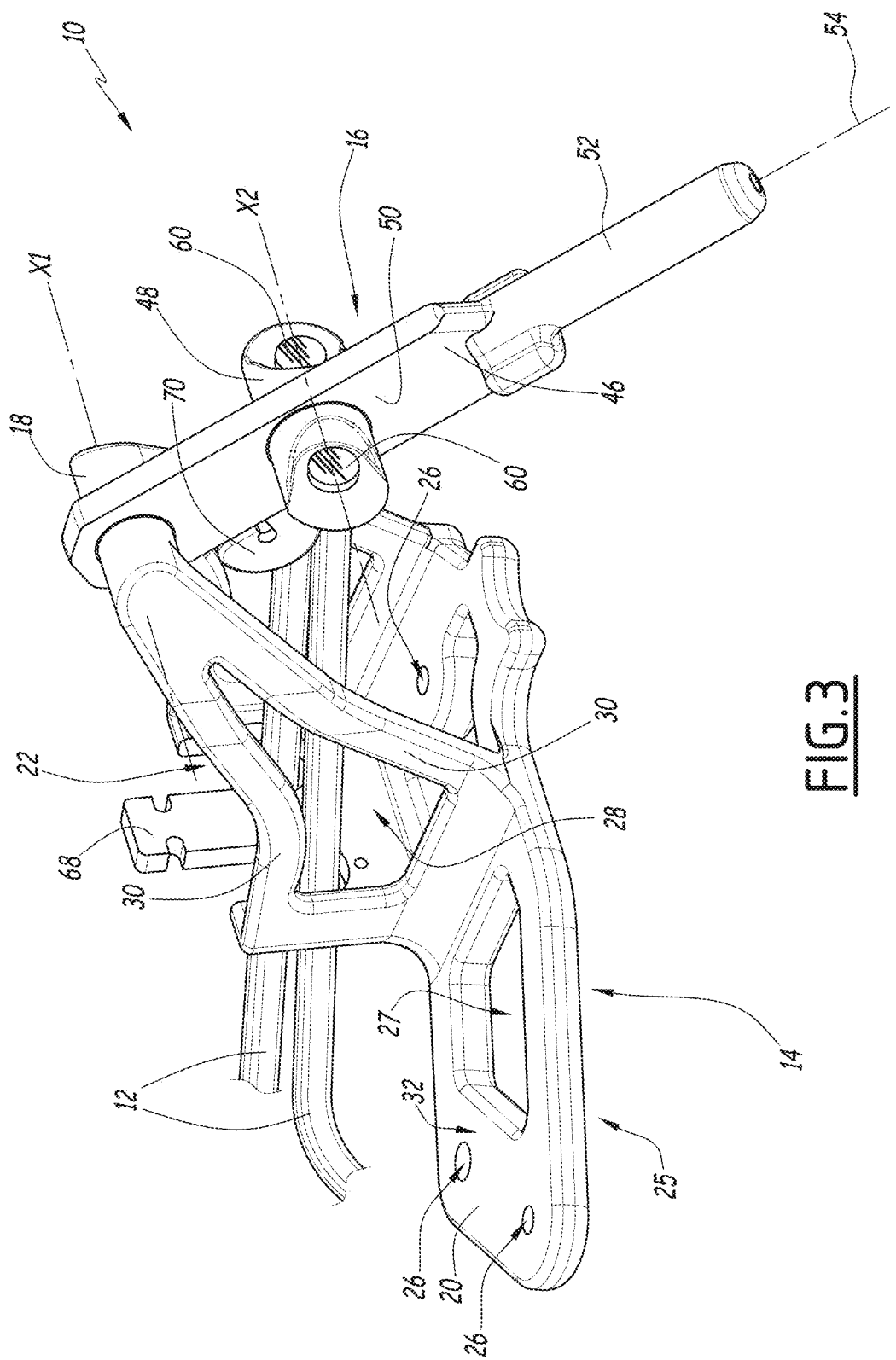
FIG. 3 is a schematic perspective view of the unlocking system shown in FIG. 2, in the unlocking position.

The unlocking device 16 is movable in rotation with respect to the support 14 about the first axis of rotation X1 between a rest position, an example of which is illustrated in FIG. 2, and at least one unlocking position, an example of which is illustrated in FIG. 3. In the unlocking position, the unlocking device 16 is configured for exerting a traction on the cable(s) 12 in order to unlock the brake(s) 8. In the rest position, the unlocking device 16 in particular exerts no traction force on the cable(s) 12.

The base structure 20 of the support 14 includes a generally flat structure, having a lower face 25 for being in contact with the bogie 1, in particular with the chassis 2 of the bogie 1. For example, the base structure 20 has a plurality of through holes 26 for receiving attachment screws (not shown), for attachment the base structure 20 to the bogie 1.

The base structure 20 delimits at least one slot 27, e.g. two slots 27. This makes it possible, more particularly, to reduce the weight of the support 14 by reducing the quantity of material needed for producing the basic structure 20.

The connecting structure 22 delimits e.g. at least one aperture 28.

For example, the connecting structure 22 comprises two pairs of branches 30, in particular symmetrical with respect to a plane substantially perpendicular to the first axis of rotation X1. Each pair of branches 30 delimits, e.g., a respective aperture 28. Each pair of branches 30 protrudes e.g. from the base structure 20, more particularly from an upper face 32 of the base structure 20 on an opposite side with respect to the lower face 25. Each pair of branches 30 is e.g. connected to a respective end of the shaft 18.

For example, each pair of branches 30 includes a portion 34 curved towards the other pair of branches 30. The curved part 34 is more particularly connected to the respective end of the shaft 18.

Figure 4:
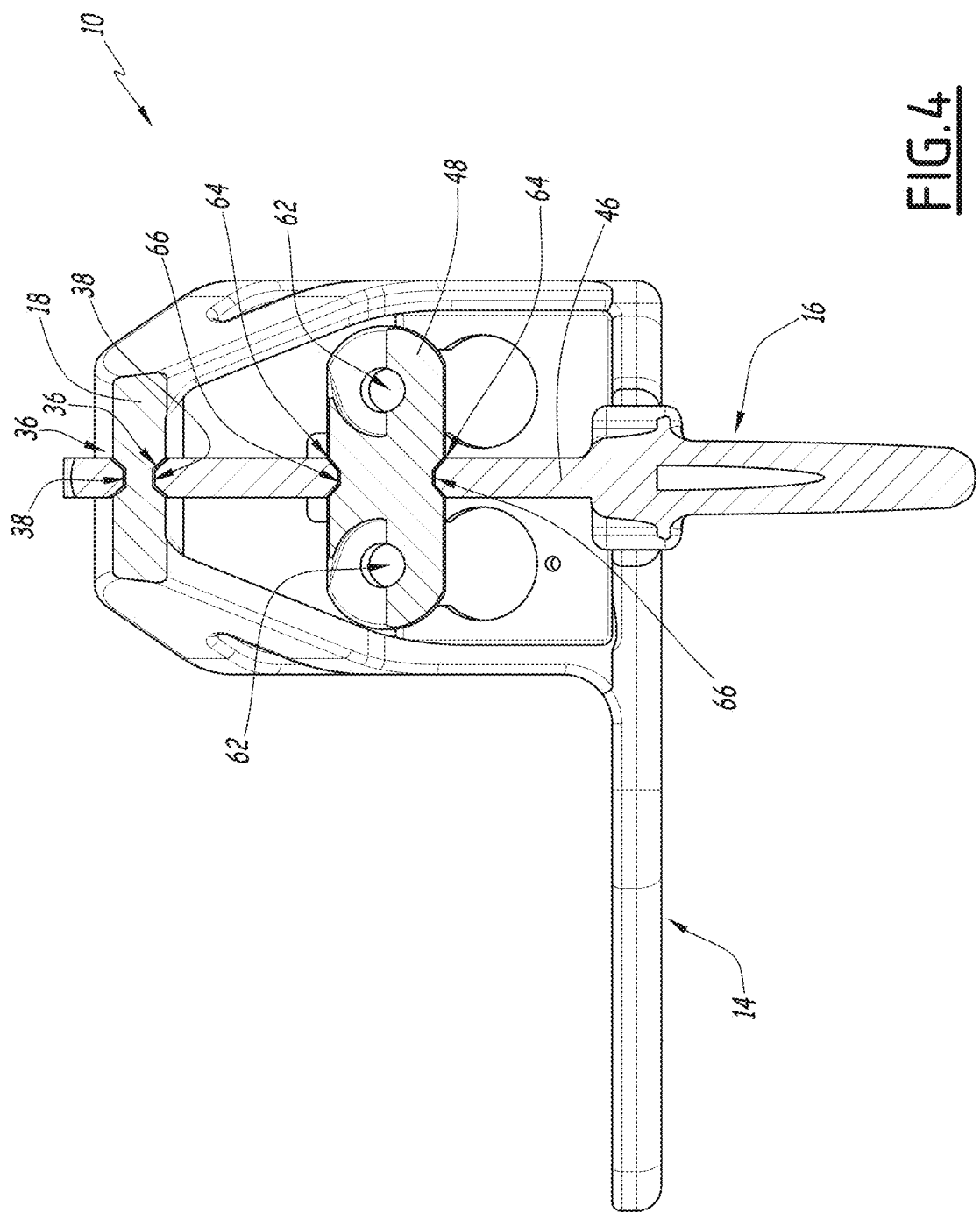
FIG. 4 is a schematic representation of the unlocking system shown in FIG. 2, in the rest position, in a section along a first plane comprising a first axis of rotation of the unlocking system.
Figure 5:
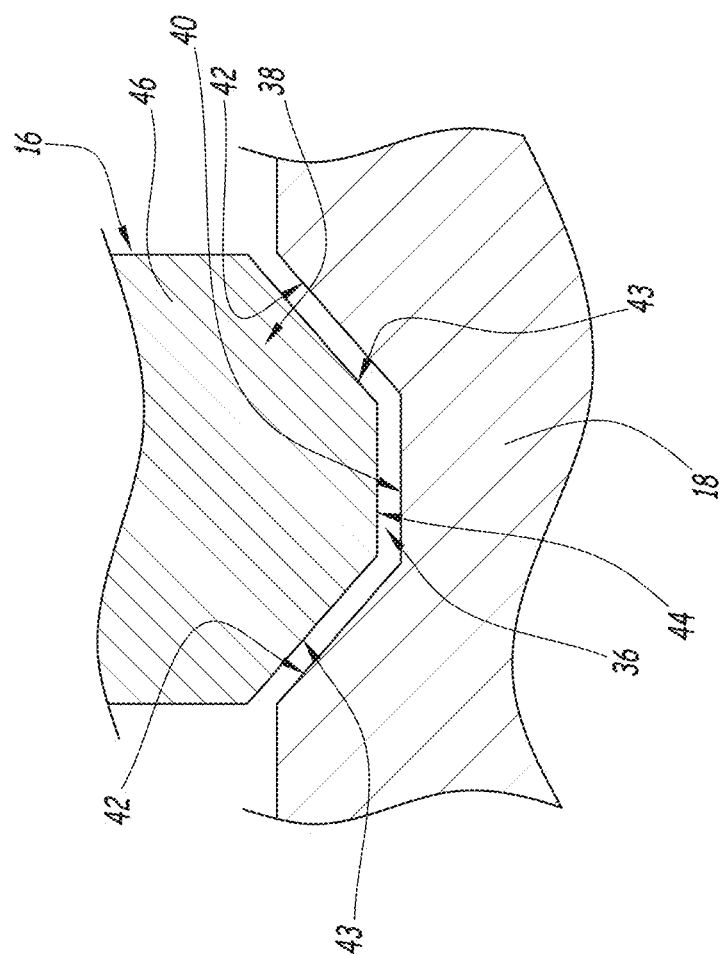
FIG. 5 is a part of the schematic representation shown in FIG. 4.

The shaft 18 has e.g. a first groove 36, visible in particular in FIGS. 4 and 5, arranged circularly all around the first axis of rotation X1. In the present example, the unlocking device 16 includes a first protruding part 38 matching the first groove 36. More particularly, the first protruding part 38 is received in the first groove 36, all around the first axis of rotation X1.

The first groove 36 and the first protruding part 38 are more particularly produced by additive manufacturing.

The first groove 36 and the first protruding part 38 together form a first revolute joint which cannot be disassembled, between the shaft 18 and the unlocking device 16, making the unlocking device 16 movable with respect to the support 14 about the first axis of rotation X1.

The person skilled in the art understands that the first revolute joint which cannot be disassembled, is produced by additive manufacture of at least part of the unlocking system because the first protruding part 38 matches the first groove 36 which extends circularly all around the first axis of rotation X1. When the support 14 and the unlocking device 16 are manufactured separately from each other by welding, machining, molding or forging, it would be impossible in particular to mount the first protruding part 38 in a way matching the first groove 36. More particularly, the first protruding part 38 prevents the unlocking device 16 from moving in translation along the first axis of rotation X1 with respect to the support 14. Subsequent mounting is then impossible.

Because of the inaccessibility from the outside of the first revolute joint which cannot be disassembled, formed by the first groove 36 and the first protruding part 38, at least part of the unlocking system 10, more particularly at least one among the support 14 and the unlocking device 16, is produced by additive manufacturing. More particularly welding, machining or forging alone cannot be used for producing the first revolute joint which cannot be dismantled because of the inaccessibility of the first groove 36, nor does molding due to stresses related to mold release.

As illustrated e.g. in FIGS. 4 and 5, surfaces of the first groove 36 directly face the first protruding part 38, more particularly in the absence of other connecting parts between the shaft 18 and the unlocking device 16.

For example, the first groove 36 has a first base face 40 and at least one first lateral face 42, e.g. two first lateral faces 42, one of which extends from each end of the first base face 40.

The first protruding part 38 preferentially also extends all around the first axis of rotation X1.

For example, as can be seen more particularly in FIG. 5, the first protruding part 38 has faces 43 matching the first lateral faces 42 and oriented parallel to the faces 42, and a face 44 matching the first base face 40 and oriented parallel to the face 40.

Preferentially, the first protruding part 38 and the first groove 36 have a clearance substantially equal to 0.3 mm.

"Clearance" means a distance between the faces 40, 42 of the groove 38 and the matching faces 43, 44 of the first protruding part 38, measured along directions perpendicular to the faces 40, 42.

According to a variant (not shown), the unlocking device 16 has the first groove 36, arranged circularly all around the first axis of rotation X1, and the shaft 18 has the first protruding part 38 matching the first groove 36.

The unlocking device 16 comprises e.g. a lever 46 and an attachment element 48 which is movable in rotation with respect to the lever 46 about the second axis of rotation X2 parallel to the first axis of rotation X1.

Preferentially, the unlocking system 16 is made of aluminum.

Preferentially, the lever 46 is made of only one piece. The above means that the different parts of the lever 46 are integral with one another.

The lever 46 includes a main body 50 and a gripping part 52, comprising e.g. a handle or a control for applying a force for the displacement of the lever 46 between the rest position and the unlocking position.

The main body 50 extends from one end of the gripping part 52 along a lever axis 54 substantially perpendicular to the first axis of rotation X1.

Figure 6:
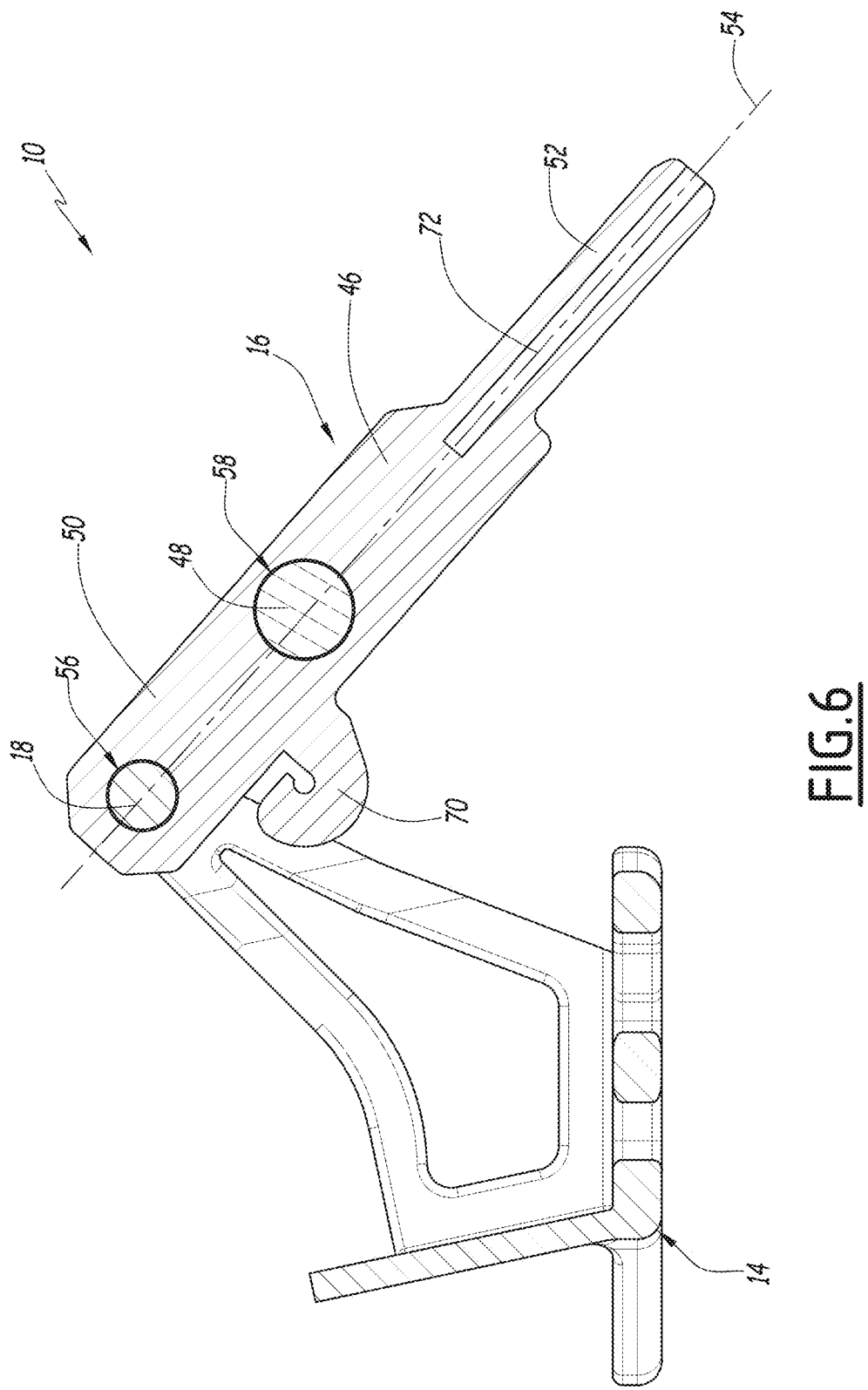
FIG. 6 is a schematic representation of the unlocking system shown in FIG. 3 in the unlocking position, in a section along a second plane perpendicular to the first axis of rotation.

The main body 50 has e.g. as can be seen in particular in FIG. 6, a first hole 56 letting through the shaft 18 along the first axis of rotation X1 and a second hole 58 letting through the attachment element 48 along the second axis of rotation X2.

The attachment element 48 comprises e.g. at least one attachment eyelet, e.g. two, for attaching the cable(s) 12, more particularly an end 60 of the cable(s) 12, visible in particular in FIGS. 2 and 3. For example, the attachment element 48 is attached to two cables 12 by a respective attachment eyelet, each cable 12 being connected to a brake 8 distinct from each other.

Each attachment eyelet of the attachment element 48 has e.g. an opening 62 visible more particularly in FIG. 4, extending along an axis substantially perpendicular to the second axis of rotation X2. Preferentially, each opening 62 is configured for letting through a respective cable 12, for attaching the end 60 of the cable 12 to the attachment eyelet.

For visibility reasons, in FIGS. 4 and 6, the cables 12 are not shown, thus making the openings 62 visible in FIG. 4. In FIGS. 2 and 3, the cables 12 run through the openings 62 which are thereby not visible in said figures.

Preferentially, the attachment element 48 is made of only one piece. The above means in particular that the attachment element 48 is formed as an integral part.

The attachment element 48 has e.g. a second groove 64, visible in particular in FIG. 4, arranged circularly all around the second axis of rotation X2. In such example, the lever 46 includes a second protruding part 66 matching the second groove 64. More particularly, the second protruding part 66 delimits the second hole 58.

More particularly, the second groove 64 is formed from the same material as the rest of the attachment element 48.

The attachment element 48 is preferentially produced by additive manufacturing.

The second groove 64 and the second protruding part 66 are more particularly produced by additive manufacturing.

The second groove 64 and the second protruding part 66 together form a second revolute joint which cannot be disassembled, between the lever 46 and the attachment element 48, making the attachment element 48 movable with respect to the lever 46 about the second axis of rotation X2.

For example, the second groove 64 has a geometry identical to the first groove 36 and the second protruding part 66 has a geometry identical to the first protruding part 38.

According to a variant (not shown), the lever 46 has the second groove 64, arranged circularly all around the second axis of rotation X2, and the attachment element 48 has the second protruding part 66 matching the second groove 64.

More particularly, the person skilled in the art understands that the second revolute joint which cannot be disassembled, is produced by additive manufacture of at least part of the unlocking system 10, because the second protruding part 66 matches the second groove 64 which extends circularly all around the second axis of rotation X2. When the attachment element 48 and the lever 46 are manufactured separately from each other by welding, machining, molding or forging, it would be impossible in particular to mount the second protruding part 66 in a way matching the second groove 64. More particularly, the second protruding part 66 prevents the attachment element 48 from moving in translation along the second axis of rotation X2 with respect to the lever 46. Subsequent mounting is then impossible.

Because of the inaccessibility from the outside of the second revolute joint which cannot be dismantled, at least a part of the unlocking system 10, more particularly at least one element among the attachment element 48 and the lever 46, is produced by additive manufacturing. More particularly welding, machining or forging alone cannot be used for producing the second revolute joint which cannot be dismantled because of the inaccessibility of the second groove 64, nor does molding due to stresses related to mold release.

The unlocking device 16 and/or the support 14 have at least one hollow part. With reference to FIG. 6, e.g. the lever 46 has a hollow part 72, more particularly with a cylindrical shape along the lever axis 54.

The weight of the unlocking device 16 and/or of the support 14 can thereby be reduced.

According to one example, the unlocking device 16 and/or the support 14 have hollow parts of any shape, obtained by means of additive manufacturing. For example, the unlocking device 16 and/or the support 14 have hollow parts in predetermined positions, preferentially depending on the mechanical stresses applied during the operation of the unlocking system 10.

As an optional addition, the unlocking system 10 further comprises a spring element, not shown for visibility reasons. The spring element is configured for forcing the unlocking device 16 towards the rest position, shown e.g. in FIG. 2. For example, the spring element is a return spring.

For example, the spring element is attached both to the support 14, more particularly to a first hook 68 of the support 14, and to the unlocking device 16, more particularly to a second hook 70 of the lever 46, visible more particularly in FIG. 3.

For example, the spring element makes it possible at least to reduce vibrations of the unlocking device 16 during an operation of the railway vehicle.

A method for manufacturing the unlocking system 10 will now be described.

The manufacturing method comprises a first manufacturing step and a second manufacturing step.

During the first manufacturing step, a manufacturing system (not shown) manufactures the unlocking device 16.

Preferentially, the first manufacturing step comprises an additive manufacturing step, wherein the manufacturing system manufactures the unlocking device 16 at least partially, preferentially entirely, by additive manufacturing.

For example, the manufacturing system manufactures the unlocking device 16 by manufacturing the unlocking device 16 from one end to the other end, along the lever axis 54. Preferentially, the manufacturing system manufactures the lever 46 and the attachment element 48, directly inserted into an inserted position wherein the attachment element 48 crosses through the second hole 58.

During the second manufacturing step, the manufacturing system manufactures the support 14.

Preferentially, the second manufacturing step comprises an additive manufacturing step, during which the manufacturing system manufactures the support 14 at least partially, preferentially entirely, by additive manufacturing.

For example, the manufacturing system manufactures the support 14 so as to obtain the shaft 18 directly inserted in an inserted position, wherein the shaft 18 runs through the first hole 56.

It can be perceived that the unlocking system 10 and the manufacturing method according to the invention have many advantages.

Indeed, the unlocking system 10 and the manufacturing method according to the invention are, due to additive manufacturing, very simple.

More particularly, the unlocking system 10 comprises three elements which are kinematically independent, namely the support 14, the lever 46 and the attachment element 48, since the lever 46 is rotatable about the first axis of rotation X1, and the attachment element 48 is rotatable about the second axis of rotation X2. Since, due to additive manufacturing, such elements preferentially cannot be disassembled with respect to each other, it is sufficient to manufacture the elements 14, 46 and 48 together by additive manufacturing in order to produce the unlocking system 10, without resorting to e.g. an additional mounting step.

Finally, due to additive manufacturing which involves e.g. the integration of apertures 27, 28 and hollow parts 72, the unlocking system 10 is very light.

What is claimed is:

1. An unlocking system for unlocking at least one brake of a bogie comprising:
   an unlocking device configured to be attached to at least one cable connected to the at least one brake; and
   a support comprising a shaft forming a first axis of rotation, the unlocking device being rotatable with respect to the support about the first axis of rotation between a rest position and at least one unlocking position, wherein the unlocking device is configured to exert a traction on the at least one cable,
   wherein the unlocking system is produced at least partially by additive manufacturing,
   wherein the unlocking system comprises a first groove between the unlocking device and the shaft, wherein the first groove is produced by the additive manufacturing and arranged circularly all around the first axis of rotation,
   wherein the unlocking device comprises a first protruding part produced by the additive manufacturing, wherein the first protruding part is configured to protrude into the shaft and match the first groove such that a combination of the first protruding part and the first groove prevents the unlocking device from moving in translation along the first axis of rotation with respect to the support.

2. The unlocking system according to claim 1, wherein the unlocking device comprises a lever, including a gripping part, and an attachment element configured for being attached to the at least one cable.

3. The unlocking system according to claim 2, wherein the attachment element is rotatable with respect to the lever about a second axis of rotation parallel to the first axis of rotation.

4. The unlocking system according to claim 3, wherein the lever has an opening letting through the attachment element along the second axis of rotation.

5. The unlocking system according to claim 4, wherein one of the attachment element and the lever includes a second groove, produced by additive manufacturing and arranged circularly all around the second axis of rotation, and the other among the attachment element and the lever include a second protruding part, produced by additive manufacturing, matching the second groove.

6. The unlocking system according to claim 4, wherein the attachment element comprises at least one attachment eyelet for the attachment of the at least one cable, the attachment eyelet having an opening extending along an axis substantially perpendicular to the second axis of rotation.

7. The unlocking system according to claim 1, wherein the support comprises a base structure configured for being attached to the bogie, and a connecting structure defining at least one aperture, the connecting structure connecting the base structure to the shaft.

8. The unlocking system according to claim 1, wherein the unlocking device is configured for being attached to at least two cables connected to distinct brakes.

9. A bogie comprising at least one brake and at least one cable connected to said brake, wherein the bogie comprises an unlocking system according to claim 1, the cable being attached to the unlocking device of said unlocking system.

10. A method for manufacturing a system for unlocking at least one brake of a bogie, comprising:
    manufacturing an unlocking device configured to be attached to at least one cable connected to at least one brake;
    manufacturing a support comprising a shaft forming a first axis of rotation, the unlocking device being rotatable with respect to the support about the first axis of rotation between a rest position and at least one unlocking position, wherein the unlocking device is configured to be exert a traction on the at least one cable,
    wherein said manufacturing the unlocking device or the support comprises additive manufacturing,
    wherein the method further comprises:
    manufacturing a first groove between the unlocking device and the shaft, wherein the first groove is produced by the additive manufacturing and arranged circularly all around the first axis of rotation; and
    manufacturing a first protruding part in the unlocking device by the additive manufacturing, wherein the first protruding part is configured to protrude into the shaft and match the first groove such that a combination of the first protruding part and the first groove prevents the unlocking device from moving in translation along the first axis of rotation with respect to the support.

11. An unlocking system for unlocking at least one brake of a bogie, comprising:
    an unlocking device configured to be attached to at least one cable connected to the at least one brake; and
    a support comprising a shaft forming a first axis of rotation, the unlocking device being rotatable with respect to the support about the first axis of rotation between a rest position and at least one unlocking position, wherein the unlocking device is configured to exert a traction on the at least one cable,
    wherein the unlocking system is produced at least partially by additive manufacturing,
    wherein the unlocking device comprises a lever including a gripping part, and an attachment element configured to be attached to the at least one cable,
    wherein the attachment element is rotatable with respect to the lever about a second axis of rotation parallel to the first axis of rotation,
    wherein the lever has an opening letting through the attachment element along the second axis of rotation,
    wherein the unlocking system further comprises a second groove between the attachment element and the lever, wherein the second groove is produced by the additive manufacturing and arranged circularly all around the second axis of rotation,
    wherein the lever comprises a second protruding part produced by the additive manufacturing, wherein the second protruding part is configured to protrude into the attachment element and match the second groove such that a combination of the second protruding part and the second groove prevents the unlocking device from moving in translation along the second axis of rotation with respect to the support.

* * * * *